(12) United States Patent
Zheng

(10) Patent No.: US 10,441,108 B2
(45) Date of Patent: Oct. 15, 2019

(54) PORTABLE SMOKELESS CHARCOAL CHARBROILER

(71) Applicant: JIANGMEN TBL INDUSTRY AND ENTERPRISE CO., LTD, Jiangmen, Guangdong (CN)

(72) Inventor: Jianqiang Zheng, Guangdong (CN)

(73) Assignee: JIANGMEN TBL INDUSTRY AND ENTERPRISE CO., LTD., Jiangmen (CN)

( * ) Notice: Subject to any disclaimer, the term of this patent is extended or adjusted under 35 U.S.C. 154(b) by 536 days.

(21) Appl. No.: 15/033,908

(22) PCT Filed: Jan. 7, 2016

(86) PCT No.: PCT/CN2016/070423
§ 371 (c)(1),
(2) Date: May 3, 2016

(87) PCT Pub. No.: WO2017/101183
PCT Pub. Date: Jun. 22, 2017

(65) Prior Publication Data
US 2018/0035846 A1 Feb. 8, 2018

(30) Foreign Application Priority Data
Dec. 16, 2015 (CN) .................. 2015 2 10693937 U

(51) Int. Cl.
*A47J 37/07* (2006.01)

(52) U.S. Cl.
CPC ....... *A47J 37/0754* (2013.01); *A47J 37/0763* (2013.01); *Y02A 40/928* (2018.01)

(58) Field of Classification Search
CPC .... A47J 37/0754; A47J 37/0763; A47J 37/06; A47J 37/079; A47J 37/0704; Y02A 40/928
See application file for complete search history.

(56) References Cited

U.S. PATENT DOCUMENTS 10,098,502 B2 * 10/2018 Ohler .................. A47J 37/0704

FOREIGN PATENT DOCUMENTS

DE 102014213770 * 9/2015

* cited by examiner

*Primary Examiner* — Alfred Basichas

(57) ABSTRACT

The invention discloses a portable smokeless charcoal charbroiler comprising a shell, an insulating inner sleeve arranged inside the shell, a barbecue grill arranged above the insulating inner sleeve and a charcoal combustion chamber in the middle of the insulating inner sleeve, wherein, an air blower is connected to the lower part of said charcoal combustion chamber, a removable combustion chamber cover is arranged above the charcoal combustion chamber, an ignition disc is arranged below the charcoal combustion chamber, and an ignition cavity is arranged between the ignition disc and the charcoal combustion chamber. Such portable smokeless charcoal charbroiler is easier to ignite and charcoal can be sufficiently burnt and can prevent cook-off when grease and soybean sauce drip on charcoal, thus the portable smokeless charcoal charbroiler is characterized by no contamination to food, easy to clean ash in the charcoal combustion chamber, and easy to use and maintain.

17 Claims, 4 Drawing Sheets

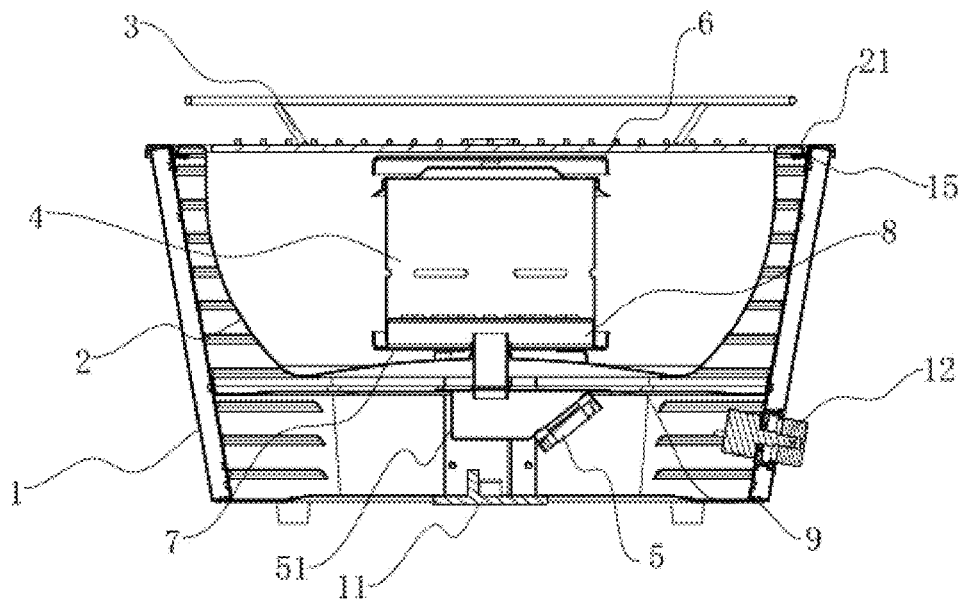
Fig. 3
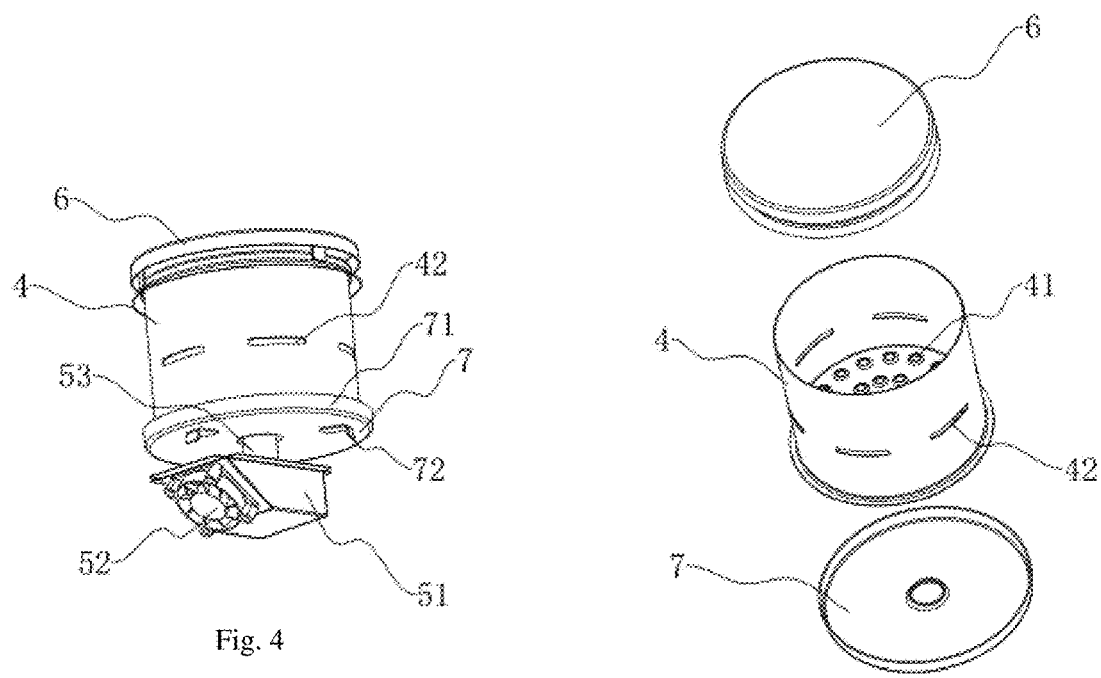
Fig. 4
Fig. 5

PORTABLE SMOKELESS CHARCOAL CHARBROILER

TECHNICAL FIELD

The invention relates to a charbroiler, in particular to a charcoal charbroiler.

BACKGROUND

Traditional charcoal barbecue is widely preferred by the masses for its authentic flavor. However, it is difficult to deal with the charcoal ash which contaminates food after use of an existing charcoal charbroiler. And it is also not easy to ignite the charbroiler. In addition, such charcoal charbroiler produces dense cooking fumes in the barbecue process, and cook-off always occurs when grease out of food and soybean sauce drip on charcoal, affecting the barbecue effect. Moreover, the smell of charred grease and soybean sauce is bad, and cleaning is troublesome after barbecue, reducing the user experience.

SUMMARY OF THE INVENTION

A technical problem to be solved by the invention is to provide a smokeless charcoal charbroiler characterized by easy ignition, cleaning and maintenance without contamination.

In order to solve above technical problems, the invention provides a portable smokeless charcoal charbroiler comprising a shell, an insulating inner sleeve arranged inside the shell, a barbecue grill arranged above the insulating inner sleeve and a charcoal combustion chamber in the middle of the insulating inner sleeve, wherein, an air blower is connected to the lower part of said charcoal combustion chamber, a removable combustion chamber cover is arranged above the charcoal combustion chamber, an ignition disc is arranged below the charcoal combustion chamber, and an ignition cavity is arranged between the ignition disc and the charcoal combustion chamber.

An intermediate insulating plate is installed below said insulating inner sleeve, said air blower is installed at the bottom of the intermediate insulating plate, the air blower comprises an air holder, a blower fan is connected to the air holder, and a ventilation duct communicating the charcoal combustion chamber and the air holder is connected to the intermediate insulating plate.

A peripheral edge projecting upward is arranged at one side of said ignition disc, the distance between the peripheral edge and the said one side of the charcoal combustion chamber is 1-3 mm, and said ignition cavity is 15-20 mm high.

Said charcoal combustion chamber is of a barrel shape, small ventilation holes are arranged on the underside thereof, at least one long hole is arranged at one side wall of the charcoal combustion chamber, and the distance between the long hole and the bottom of the charcoal combustion chamber is 30-45 mm.

Said combustion chamber cover is composed of two layers of fine-mesh screen, the distance between the two layers of fine-mesh screen is 3-15 mm, and the combustion chamber cover completely covers the top of the charcoal combustion chamber.

Three supporting legs that have downward folded edges and keep the ignition disc upright in the insulating inner sleeve are arranged at the bottom of said ignition disc.

Said insulating inner sleeve is of a bowl shape, the bottom thereof is of an inwardly projecting arc and the top end of the insulating inner sleeve projects laterally outward to form a folded edge.

A baffle with position corresponding to the combustion chamber cover and area larger than the combustion chamber cover is arranged on said barbecue grill, said baffle is of an arc and the middle part projects upward, and the barbecue grill is provided with legs used for inserting into said folded edge.

An annular groove is arranged on a top plate of said shell, and the folded edge of said insulating inner sleeve is in snap-fit with the annular groove.

Connecting lugs are arranged at two sides of said barbecue grill, and control buckles correspondingly in snap-fit with the connecting lugs are arranged at two sides of said shell.

A mounting hole is arranged on a base plate of said shell, a battery compartment is snapped and fixed on the mounting hole, a removable battery compartment cover is arranged on the battery compartment, a control switch used for controlling the blower fan is mounted on a side plate of the shell, and the control switch is located below the intermediate insulating plate.

The invention has the following benefits: such portable smokeless charcoal charbroiler uses a charcoal combustion chamber, an air blower and an ignition disc, so that it is easier to ignite and charcoal can be sufficiently burnt, and the removable combustion chamber cover arranged above the charcoal combustion chamber can prevent cook-off when grease and soybean sauce drip on charcoal, thus the portable smokeless charcoal charbroiler is characterized by no contamination to food, easy to clean ash in the charcoal combustion chamber, and easy to use and maintain.

BRIEF DESCRIPTION OF THE DRAWINGS

The invention will be further described in details in conjunction with drawings and preferred examples.

FIG. 3 is a sectional structural diagram of the invention;

FIG. 4 is a structural diagram of a charcoal combustion chamber;

FIG. 5 is a disassembled structural diagram of a charcoal combustion chamber;

DETAILED DESCRIPTION OF THE PREFERRED EMBODIMENT

Figure 1:
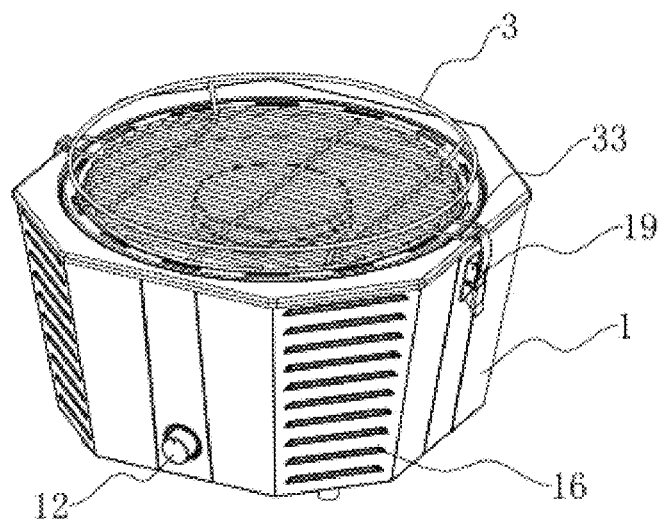
FIG. 1 is a structural diagram of the invention.

Referring to FIG. 1, a portable smokeless charcoal charbroiler of the invention comprises a shell (1), an insulating inner sleeve (2) arranged inside the shell (1), a barbecue grill (3) arranged above the insulating inner sleeve (2) and a charcoal combustion chamber (4) in the middle of the insulating inner sleeve (2), wherein, an air blower (5) is connected to the lower part of said charcoal combustion chamber (4), a removable combustion chamber cover (6) is arranged above the charcoal combustion chamber (4), an ignition disc (7) is arranged below the charcoal combustion chamber (4), and an ignition cavity (8) is arranged between the ignition disc (7) and the charcoal combustion chamber (4). Such portable smokeless charcoal charbroiler uses a charcoal combustion chamber, an air blower and an ignition disc, so that it is easier to ignite and charcoal can be sufficiently burnt, and the removable combustion chamber cover arranged above the charcoal combustion chamber can prevent cook-off when grease and soybean sauce drip on charcoal, thus the portable smokeless charcoal charbroiler is characterized by no contamination to food, easy to clean ash in the charcoal combustion chamber, and easy to use and maintain.

Figure 2:
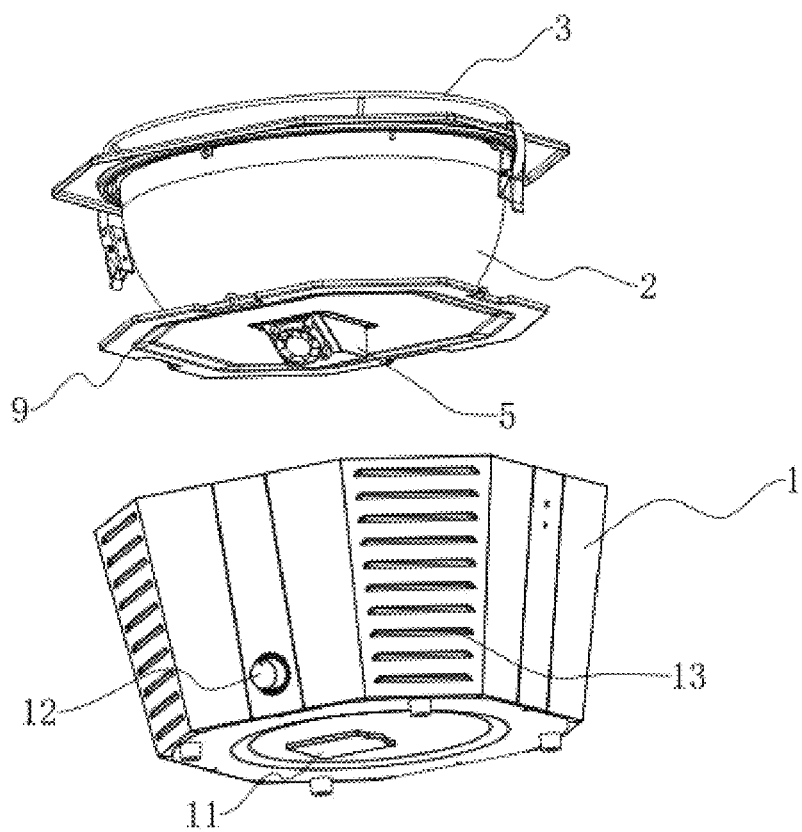
FIG. 2 is a disassembled structural diagram of the invention.

Referring to FIG. 2 to FIG. 4, an intermediate insulating plate (9) is installed below said insulating inner sleeve (2), said air blower (5) is installed at the bottom of the intermediate insulating plate (9), the air blower (5) comprises an air holder (51), a blower fan (52) is connected to the air holder (51), and a ventilation duct (53) communicating the charcoal combustion chamber (4) and the air holder (51) is connected to the intermediate insulating plate (9). The intermediate insulating plate 9 can prevent excessive heat radiating to the bottom of the charbroiler, affecting the operation of the electrical appliance, thus the product has more reliable performance. A ventilation louver (16) with an upward outlet is arranged at one side of the shell (1), so that hot air in the shell can be discharged in time.

A peripheral edge (71) projecting upward is arranged at one side of said ignition disc (7), the distance between the peripheral edge (71) and one side of the charcoal combustion chamber (4) is 1-3 mm, and said ignition cavity (8) is 15-20 mm high, solid or pasty alcohol is loaded in the ignition cavity to facilitate sufficient burning of alcohol, so that charcoal in the charcoal combustion chamber is easy to ignite.

Referring to FIG. 4, said charcoal combustion chamber (4) is of a barrel shape, small ventilation holes (41) are arranged on the underside thereof, at least one long hole (42) is arranged at one side wall of the charcoal combustion chamber (4), and the distance between the long hole (42) and the bottom of the charcoal combustion chamber is 30-45 mm so as to promptly make up air in the charcoal combustion chamber, thus charcoal can be burnt sufficiently.

Figure 6:
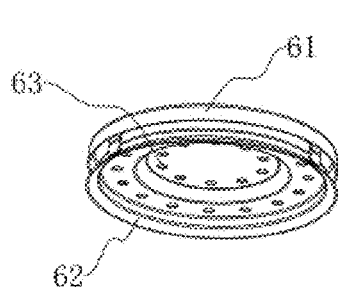
FIG. 6 is another structural diagram of a combustion chamber cover.

Referring to FIG. 5, said combustion chamber cover (6) is composed of two layers of fine-mesh screen, the distance between the two layers of fine-mesh screen is 3-15 mm, and the combustion chamber cover (6) completely covers the top of the charcoal combustion chamber so as to properly protect the charcoal combustion chamber, prevent entry of grease or foreign matters, and have good ventilation effect without affecting charcoal burning. Referring to FIG. 6, as another example, the combustion chamber cover (6) is composed of an upper cover plate (61) and a lower cover plate (62), multiple small holes (63) are arranged on the lower cover plate (62), and the distance between the upper cover plate (61) and the lower cover plate (62) is 5-15 mm.

Three supporting legs (72) that have downward folded edges and keep the ignition disc upright in the insulating inner sleeve are arranged at the bottom of said ignition disc (7), said insulating inner sleeve (2) is of a bowl shape, the bottom thereof is of an inwardly projecting arc, and the top end of the insulating inner sleeve (2) projects laterally outward to form a folded edge (21) to enable more stable positioning of the ignition disc.

Figure 7:
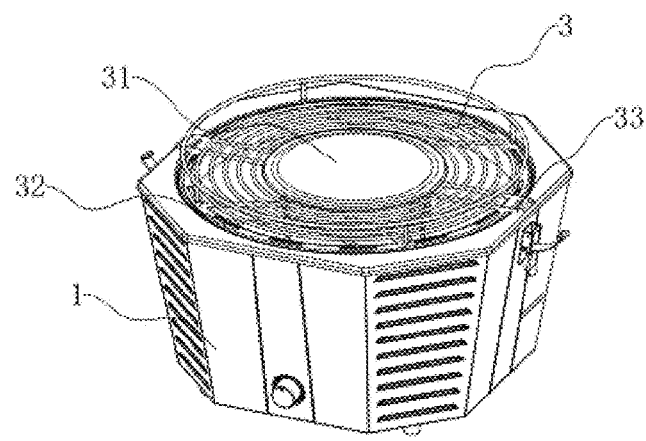
FIG. 7 is another structural diagram of the invention.

Referring to FIG. 7, a baffle (31) with position corresponding to the combustion chamber cover (6) and area larger than the combustion chamber cover is arranged on said barbecue grill (3), said baffle (31) is of an arc and the middle part projects upward, and the barbecue grill (3) is provided with legs (32) used for inserting into said folded edge (21).

An annular groove (15) is arranged on a top plate of said shell (1), and the folded edge (21) of said insulating inner sleeve (2) is in snap-fit with the annular groove (15) to enable simple assembling and positioning and easy disassembling of the product.

Connecting lugs (33) are arranged at two sides of said barbecue grill (3), and control buckles (9) correspondingly in snap-fit with the connecting lugs (33) are arranged at two sides of said shell (1) to enable simple assembling and disassembling and easy cleaning and maintenance of the barbecue grill.

Figure 8:
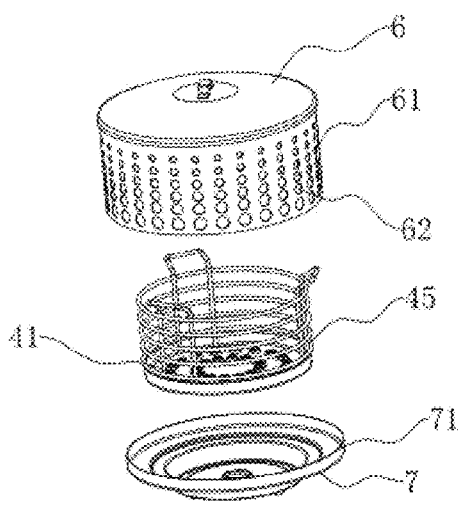
FIG. 8 is a second structural diagram of a charcoal combustion chamber.

Referring to FIG. 8, as a second structure of said charcoal combustion chamber, multiple rows of air vents (62) are arranged on a side wall (61) of the combustion cover (6), the charcoal combustion chamber (4) is provided with a barrel shape wire bracket (45), small ventilation holes (41) are arranged on a base plate connected with the charcoal combustion chamber (4), an ignition disc (7) is arranged below the charcoal combustion chamber, an ignition cavity is arranged between the ignition disc (7) and the charcoal combustion chamber (4), and the distance between the side wall (61) of the combustion chamber cover and the peripheral edge (71) of the ignition disc is 1-3 mm so that charcoal can be concentrated and ignited easily.

Figure 9:
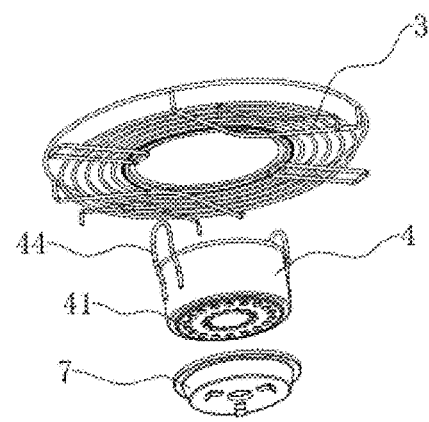
FIG. 9 is a third structural diagram of a charcoal combustion chamber.

Referring to FIG. 9, as a third structure of said charcoal combustion chamber, the charcoal combustion chamber (4) is of a barrel shape, small ventilation holes (41) are arranged on the underside thereof, one side of the charcoal combustion chamber (4) is closed and installed with a lift ring (44), an ignition disc (7) is arranged below the charcoal combustion chamber, and an ignition cavity is arranged between the ignition disc (7) and the charcoal combustion chamber (4).

Figure 10:
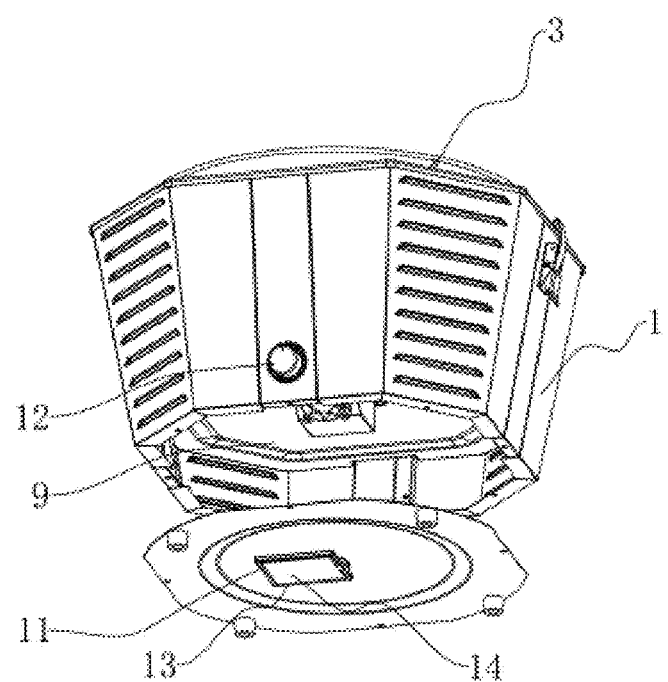
FIG. 10 is a structural diagram of a battery compartment.

Referring to FIG. 10, a mounting hole (13) is arranged on a base plate of said shell (1), a battery compartment (11) is snapped and fixed on the mounting hole (13), a removable battery compartment cover (14) is arranged on the battery compartment (11), a control switch (12) used for controlling the blower fan is mounted on a side plate of the shell (1), and the control switch (12) is located below the intermediate insulating plate (9).

The foregoing is only preferred examples of the invention, and technical schemes to achieve the objectives of the invention by the same basic means shall be included within the protection scope of the invention.

What is claimed is:

1. A portable smokeless charcoal charbroiler, comprising a shell (1), an insulating inner sleeve (2) arranged inside the shell (1), a barbecue grill (3) arranged above the insulating inner sleeve (2) and a charcoal combustion chamber (4) in the middle of the insulating inner sleeve (2), wherein, an air blower (5) is connected to the lower part of said charcoal combustion chamber (4), a removable combustion chamber cover (6) is arranged above the charcoal combustion chamber (4), an ignition disc (7) is arranged below the charcoal combustion chamber (4), and an ignition cavity (8) is arranged between the ignition disc (7) and the charcoal combustion chamber (4);

wherein, said combustion chamber cover (6) is composed of two layers of fine-mesh screen, the distance between the two layers of fine-mesh screen is 3-15 mm, and the combustion chamber cover (6) completely covers the top of the charcoal combustion chamber.

2. The portable smokeless charcoal charbroiler according to claim 1, wherein, an intermediate insulating plate (9) is installed below said insulating inner sleeve (2), said air blower (5) is installed at the bottom of the intermediate insulating plate (9), the air blower (5) comprises an air holder (51), a blower fan (52) is connected to the air holder (51), and a ventilation duct (53) communicating the charcoal combustion chamber (4) and the air holder (51) is connected to the intermediate insulating plate (9).

3. The portable smokeless charcoal charbroiler according to claim 1, wherein a peripheral edge (71) projecting upward is arranged at one side of said ignition disc (7), the distance between the peripheral edge (71) and one side of the charcoal combustion chamber (4) is 1-3 mm, and said ignition cavity (8) is 15-20 mm high.

4. The portable smokeless charcoal charbroiler according to claim 3, wherein, said charcoal combustion chamber (4) is of a barrel shape, small ventilation holes (41) are arranged on the underside thereof, at least one long hole (42) is arranged at one side wall of the charcoal combustion chamber (4), and the distance between the long hole (42) and the bottom of the charcoal combustion chamber is 30-45 mm.

5. The portable smokeless charcoal charbroiler according to claim 3, wherein, three supporting legs (72) that have downward folded edges and keep the ignition disc upright in the insulating inner sleeve are arranged at the bottom of said ignition disc (7).

6. The portable smokeless charcoal charbroiler according to claim 3, wherein, said insulating inner sleeve (2) is of a bowl shape, the bottom thereof is of an inwardly projecting arc, and the top end of the insulating inner sleeve (2) projects laterally outward to form a folded edge (21).

7. The portable smokeless charcoal charbroiler according to claim 6, wherein, a baffle (31) with position corresponding to the combustion chamber cover (6) and area larger than the combustion chamber cover is arranged on said barbecue grill (3), said baffle (31) is of an arc and the middle part projects upward, and the barbecue grill (3) is provided with legs (32) used for inserting into said folded edge (21).

8. The portable smokeless charcoal charbroiler according to claim 6, wherein, connecting lugs (33) are arranged at two sides of said barbecue grill (3), and control buckles (9) correspondingly in snap-fit with the connecting lugs (33) are arranged at two sides of said shell (1).

9. The portable smokeless charcoal charbroiler according to claim 6, wherein, a mounting hole (13) is arranged on a base plate of said shell (1), a battery compartment (11) is snapped and fixed on the mounting hole (13), a removable battery compartment cover (14) is arranged on the battery compartment (11), a control switch (12) used for controlling the blower fan is mounted on a side plate of the shell (1), and the control switch (12) is located below the intermediate insulating plate (9).

10. The portable smokeless charcoal charbroiler according to claim 2, wherein a peripheral edge (71) projecting upward is arranged at one side of said ignition disc (7), the distance between the peripheral edge (71) and one side of the charcoal combustion chamber (4) is 1-3 mm, and said ignition cavity (8) is 15-20 mm high.

11. The portable smokeless charcoal charbroiler according to claim 10, wherein, said charcoal combustion chamber (4) is of a barrel shape, small ventilation holes (41) are arranged on the underside thereof, at least one long hole (42) is arranged at one side wall of the charcoal combustion chamber (4), and the distance between the long hole (42) and the bottom of the charcoal combustion chamber is 30-45 mm.

12. The portable smokeless charcoal charbroiler according to claim 10, wherein, said combustion chamber cover (6) is composed of two layers of fine-mesh screen, the distance between the two layers of fine-mesh screen is 3-15 mm, and the combustion chamber cover (6) completely covers the top of the charcoal combustion chamber.

13. The portable smokeless charcoal charbroiler according to claim 10, wherein, three supporting legs (72) that have downward folded edges and keep the ignition disc upright in the insulating inner sleeve are arranged at the bottom of said ignition disc (7).

14. The portable smokeless charcoal charbroiler according to claim 10, wherein, said insulating inner sleeve (2) is of a bowl shape, the bottom thereof is of an inwardly projecting arc, and the top end of the insulating inner sleeve (2) projects laterally outward to form a folded edge (21).

15. The portable smokeless charcoal charbroiler according to claim 14, wherein, a baffle (31) with position corresponding to the combustion chamber cover (6) and area larger than the combustion chamber cover is arranged on said barbecue grill (3), said baffle (31) is of an arc and the middle part projects upward, and the barbecue grill (3) is provided with legs (32) used for inserting into said folded edge (21).

16. The portable smokeless charcoal charbroiler according to claim 14, wherein, connecting lugs (33) are arranged at two sides of said barbecue grill (3), and control buckles (9) correspondingly in snap-fit with the connecting lugs (33) are arranged at two sides of said shell (1).

17. The portable smokeless charcoal charbroiler according to claim 14, wherein, a mounting hole (13) is arranged on a base plate of said shell (1), a battery compartment (11) is snapped and fixed on the mounting hole (13), a removable battery compartment cover (14) is arranged on the battery compartment (11), a control switch (12) used for controlling the blower fan is mounted on a side plate of the shell (1), and the control switch (12) is located below the intermediate insulating plate (9).

* * * * *

UNITED STATES PATENT AND TRADEMARK OFFICE
CERTIFICATE OF CORRECTION

| | |
|---|---|
| PATENT NO. | : 10,441,108 B2 |
| APPLICATION NO. | : 15/033908 |
| DATED | : October 15, 2019 |
| INVENTOR(S) | : Jianqiang Zheng |

Page 1 of 1

It is certified that error appears in the above-identified patent and that said Letters Patent is hereby corrected as shown below:

On the Title Page

Item (30), the foreign application priority data should read 201521063937.X instead of 2015210693937U Signed and Sealed this
Twenty-fourth Day of March, 2020

Andrei Iancu
*Director of the United States Patent and Trademark Office*